US011286400B2

(12) United States Patent
Kabagambe et al.

(10) Patent No.: US 11,286,400 B2
(45) Date of Patent: Mar. 29, 2022

(54) CURABLE COMPOSITIONS CONTAINING REACTIVE FUNCTIONAL COMPOUNDS AND POLYSILOXANE RESINS, ARTICLES OF MANUFACTURE AND COATED ARTICLES PREPARED THEREFROM, AND A METHOD OF MITIGATING DIRT BUILD-UP ON A SUBSTRATE

(71) Applicant: PPG INDUSTRIES OHIO, INC., Cleveland, OH (US)

(72) Inventors: Benjamin Kabagambe, Pittsburgh, PA (US); Susan Fundy Donaldson, Allison Park, PA (US); Ronald J. Kralic, Jr., Beaver Falls, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 834 days.

(21) Appl. No.: 16/033,835

(22) Filed: Jul. 12, 2018

(65) Prior Publication Data
US 2020/0017711 A1    Jan. 16, 2020

(51) Int. Cl.
C09D 175/08 (2006.01)
A43B 1/14 (2006.01)
(Continued)

(52) U.S. Cl.
CPC .............. *C09D 175/08* (2013.01); *A43B 1/14* (2013.01); *A43B 13/04* (2013.01); *A43B 13/12* (2013.01);
(Continued)

(58) Field of Classification Search
CPC .. C08G 2410/00; C08G 77/04; C08G 77/045; C08G 77/06; C08G 77/08; C08G 77/10; C08G 77/12; C08G 77/14; C08G 77/16; C08G 77/18; C08G 77/20; C08G 77/22; C08G 77/24; C08G 77/26; C08G 77/28; C08G 77/30; C08G 77/42; C08G 77/44; C08G 77/442; C08G 77/445; C08G 77/448; C08G 77/452; C08G 77/458; C08G 77/46; C08G 77/48; C08G 77/485; C08G 77/50; C08G 77/52; C08G 77/54; C08G 77/70; C08G 77/78; C08G 18/10; C08G 18/12; C08G 18/14; C08G 18/28; C08G 18/2805; C08G 18/281; C08G 18/2815; C08G 18/282; C08G 18/2825; C08G 18/283; C08G 18/2835; C08G 18/284; C08G 18/2845; C08G 18/285; C08G 18/2855; C08G 1/286; C08G 18/2865; C08G 18/287; C08G 18/2875; C08G 18/288; C08G 18/2885; C08G 18/289; C08G 18/2895; C08G 18/30; C08G 18/302; C08G 18/305; C08G 18/307; C08G 18/32; C08G 18/3203; C08G 18/3206; C08G 18/3209; C08G 18/3212; C08G 18/3215; C08G 18/3218; C08G 18/3221; C08G 18/3225; C08G 18/3228; C08G 18/3231; C08G 18/3234; C08G 18/3237; C08G 18/324; C08G 18/3243; C08G 18/3246; C08G 18/325; C08G 18/3253; C08G 18/3256; C08G 18/3259; C08G 18/3262; C08G 18/3265; C08G 18/3268; C08G 18/3271; C08G 18/3275; C08G 18/3278; C08G 18/3281; C08G 18/3284; C08G 18/3287; C08G 18/329; C08G 18/3293; C08G 18/3296; C08G 18/34; C08G 18/341; C08G 18/343; C08G 18/345; C08G 18/346; C08G 18/348; C08G 18/36; C08G 18/38; C08G 18/3802; C08G 18/3804; C08G 18/3812; C08G 18/3814; C08G 18/3817; C08G 18/3819; C08G 18/3821; C08G 18/3823; C08G 18/3825; C08G 18/3827; C08G 18/3829; C08G 18/3831; C08G 18/3834; C08G 18/3836; C08G 18/3838; C08G 18/384; C08G 18/3842; C08G 18/3844; C08G 18/3846; C08G 18/3848; C08G 18/3851; C08G 18/3853; C08G 18/3855; C08G 18/3857; C08G 18/3859; C08G 18/3861; C08G 18/3863; C08G 18/3865;
(Continued)

(56) References Cited

U.S. PATENT DOCUMENTS 6,057,380 A    5/2000 Birbaum et al.
7,868,120 B2   1/2011 Ambrose et al.
(Continued)

FOREIGN PATENT DOCUMENTS

EP    0 044 672     1/1982
JP    2014-152182   3/2016
(Continued)

OTHER PUBLICATIONS

Unilink 4200 technical data sheet, Jan. 1, 2009. (Year: 2009).*
Jeffamine Polyetheramine Technical Brochure, Huntsman, 2007. (Year: 2007).*

*Primary Examiner* — Christopher M Rodd
(74) *Attorney, Agent, or Firm* — Krisanne Shideler

(57) ABSTRACT

A curable composition is provided, comprising:
(A) a binder composition; and
(B) a polysiloxane resin comprising aromatic functional groups and terminal active hydrogen groups. The composition may be used to prepare articles of manufacture and coated articles, such as footwear components. The composition may additionally be used to mitigate dirt build-up on a substrate.

17 Claims, No Drawings

(51) Int. Cl.
*A43B 13/04* (2006.01)
*A43B 13/12* (2006.01)
*A43B 13/20* (2006.01)
*C09D 5/00* (2006.01)
*C08G 18/48* (2006.01)
*C08G 18/10* (2006.01)
*C09D 175/04* (2006.01)
*C08G 18/79* (2006.01)
*C09D 7/65* (2018.01)
*C08G 18/61* (2006.01)

(52) U.S. Cl.
CPC ............. *A43B 13/20* (2013.01); *C08G 18/10* (2013.01); *C08G 18/4854* (2013.01); *C08G 18/61* (2013.01); *C08G 18/79* (2013.01); *C09D 5/00* (2013.01); *C09D 7/65* (2018.01); *C09D 175/04* (2013.01); *C08G 2410/00* (2013.01)

(58) Field of Classification Search
CPC ............. C08G 18/3868; C08G 18/387; C08G 18/3872; C08G 18/3874; C08G 18/3876; C08G 18/3878; C08G 18/388; C08G 18/3882; C08G 18/3885; C08G 18/3887; C08G 18/3889; C08G 18/3891; C08G 18/3893; C08G 18/3895; C08G 18/3897; C08G 18/40; C08G 18/4009; C08G 18/4018; C08G 18/4027; C08G 18/4036; C08G 18/4045; C08G 18/4054; C08G 18/4063; C08G 18/4072; C08G 18/4081; C08G 18/409; C08G 18/44; C08G 18/52; C08G 18/54; C08G 18/542; C08G 18/544; C08G 18/546; C08G 18/548; C08G 18/56; C08G 63/00; C08G 63/04; C08G 63/06; C08G 63/08; C08G 63/10; C09J 175/00; C09J 175/02; C09J 175/04; C09J 175/06; C09J 175/08; C09J 175/10; C09J 175/12; C09J 175/14; C09J 175/16; C09J 183/00; C09J 183/04; C09J 183/06; C09J 183/08; C09J 183/10; C09J 183/12; C09J 183/14; C09J 183/16; C09D 183/00; C09D 183/04; C09D 183/06; C09D 183/08; C09D 183/10; C09D 183/12; C09D 183/14; C09D 183/16; C09D 7/65; C09D 175/00; C09D 175/02; C09D 175/04; C09D 175/06; C09D 175/08; C09D 175/10; C09D 175/12; C09D 175/14; C09D 175/16; C09D 5/00; C09D 163/00; C09D 163/04; C09D 163/06; C09D 163/08; C09D 163/10; A43B 13/00; A43B 13/02; A43B 13/023; A43B 13/026; A43B 13/04; A43B 13/12; A43B 13/122; A43B 13/125; A43B 13/127; A43B 13/20; A43B 1/10; A43B 1/12; A43B 1/14

See application file for complete search history.

(56) References Cited

U.S. PATENT DOCUMENTS

| | | | |
|---|---|---|---|
| 9,187,670 B1 | 11/2015 | Schwendeman et al. | |
| 9,481,800 B2 | 11/2016 | Palza Cordero et al. | |
| 2004/0054112 A1* | 3/2004 | Smith | C08G 18/798 528/10 |
| 2007/0083003 A1* | 4/2007 | Gupta | C08G 18/6674 524/589 |
| 2016/0058108 A1 | 3/2016 | Schiller et al. | |

FOREIGN PATENT DOCUMENTS

| | | |
|---|---|---|
| KR | 1020100023456 B1 | 2/2013 |
| KR | 1020150144476 | 5/2018 |
| WO | 2007064621 A2 | 6/2007 |

\* cited by examiner

CURABLE COMPOSITIONS CONTAINING REACTIVE FUNCTIONAL COMPOUNDS AND POLYSILOXANE RESINS, ARTICLES OF MANUFACTURE AND COATED ARTICLES PREPARED THEREFROM, AND A METHOD OF MITIGATING DIRT BUILD-UP ON A SUBSTRATE

FIELD OF THE INVENTION

The present invention relates to curable compositions that comprise reactive functional compounds and polysiloxane resins. The present invention also relates to articles of manufacture and coated articles comprising the curable compositions, as well as methods of mitigating dirt build-up on a substrate.

BACKGROUND OF THE INVENTION

Curable compositions are often used as articles of manufacture and coatings in a wide variety of industries. Such industries may include but are not limited to landcraft such as cars, trucks, sport utility vehicles, motorcycles; watercraft such as boats, ships and submarines; aircraft such as airplanes and helicopters, industrial such as commercial equipment and structures including walls and roofs; construction such as construction vehicles and structures including walls and roofs, military such as military vehicles, and military structures including walls and roofs, for example, ammunition cases and battery enclosures; architectural components such as siding, flooring, interior and exterior trim, and the like.

In these industries, coatings serve a variety of purposes such as protecting various components against damage due to corrosion, abrasion, impact, chemicals, ultraviolet light, flame and heat, and other environmental exposure. Accordingly, considerable efforts have been made to develop coating compositions with improved properties.

Curable compositions can also be used in the footwear industry. Footwear, such as a shoe, is generally divided into two parts, an upper and a sole. The upper is the portion of the footwear designed to comfortably enclose the foot, while the sole, which typically includes an insole, optionally a midsole, and an outsole, is the portion of the footwear designed to provide traction, protection, cushioning, and a durable wear surface.

The sole often includes different components made of different materials. Midsoles are typically made of foam, such as ethylene vinyl acetate (EVA) foam or polyurethane, such as TPU, foam. These materials compress resiliently under an applied load, such as the forces generated by the feet and legs during physical activity. Outsoles are often made of synthetic and/or natural rubbers, such as silica-filled rubber compositions. The outsole can also experience dirt pick-up during normal use of a shoe, affecting the aesthetics.

Easy cleaning of surfaces is a significant selling point in many industries, in both consumer and industrial markets. Easy removal of dirt and prevention of dirt build-up are desirable properties for products as diverse as automobiles and shoes. Environmental contaminants such as tar, asphalt, animal droppings, road salt, detergents, dirt, clay, and the like may damage the surface of coated vehicles, architectural surfaces, and other industrial and consumer substrates. Damage may be caused by a chemical reaction of the contaminant with the coated surface such as by chemical etching, or may involve physical removal of part or all of the coating from the substrate (i. e., "cohesive failure") upon removal of the contaminant during cleaning. Cohesive failure may also involve incomplete removal of the contaminant from the coated surface during cleaning.

It would be desirable to provide polymers and coating compositions that may be used to mitigate dirt build-up on a substrate in order to alleviate aesthetic decline and damage to coatings.

SUMMARY OF THE INVENTION

The present invention provides a curable composition comprising:
(A) a binder composition comprising one or more of:
i) a) an isocyanate functional compound and b) an amine functional compound;
(ii) a) an acid-functional compound and b) an epoxide functional compound;
(iii) a) an ethylenically unsaturated compound and b) an amine functional compound;
(iv) a) an isocyanate functional compound and b) a thiol functional compound;
(v) a) cyclic carbonate functional compound and b) an amine functional compound;
(vi) a) an acetoacetate functional compound and b) an amine functional compound;
(vii) a) an epoxide functional compound and b) an amine functional compound;
(viii) a) a thiol functional compound and b) an ethylenically unsaturated compound;
(ix) a) an ethylenically unsaturated compound and b) a malonate functional compound;
(x) a) an epoxide functional compound and b) a thiol functional compound; and
(xi) one or more ethylenically unsaturated compounds; and
(B) a polysiloxane resin comprising aromatic functional groups and terminal active hydrogen groups.

DETAILED DESCRIPTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Plural referents as used herein encompass singular and vice versa. For example, while the invention has been described in terms of "an" acrylic resin having epoxy functional groups, a plurality, including a mixture of such resins can be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of functional groups to give the equivalent weight. For example, urethane equivalent weight is based on the equivalents of urethane groups in the polyurethane material.

The curable compositions of the present invention are typically solventborne. As used herein, the terms "thermosetting" and "curable" can be used interchangeably and refer to resins that "set" irreversibly upon curing or crosslinking, wherein the polymer chains of the polymeric components are joined together by covalent bonds via chemical reaction. This property is usually associated with a crosslinking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Once cured or crosslinked, a thermosetting resin will not melt upon the application of heat and is insoluble in solvents. For example, the degree of crosslinking of the crosslinkable components ranges from 5% to 100%, such as at least 5%, or at least 35%, or at least 50%, and at most 100% or at most 85% of complete crosslinking. One skilled in the art will understand that the presence and degree of crosslinking can be determined by a variety of methods, such as ASTM D2765 (2016), in which the sample is weighed, then placed in a solvent for 24 hours, weighed again while swollen, then dried and weighed a final time. The degree of swelling and the soluble portion can be calculated.

The curable compositions of the present invention comprise (A) a binder composition. The binder composition (A) may include a first compound ("coreactive component a)") having at least two functional groups per molecule (referred to as the "I" functional groups) and a second compound ("coreactive component b)") having at least two functional groups per molecule (referred to as the "II" functional groups), where the I functional groups and the II functional groups are coreactive with each other and are often different from each other. The II functional groups may be capable of reacting with the I functional groups at moderate temperature such as less than 100° C., less than 60° C., less than 50° C., less than 40° C., less than 30° C., or less than 25° C. The I and II functional groups may react together at room temperature such as 20° C. One or both of the coreactive components a) and b) may have on average more than two reactive groups per molecule.

A first coreactive component a) may include compounds having more than one type of functional group I, and/or the second coreactive component b) may include components having more than one type of functional group II, such that the reactive mixture can comprise at least two sets of coreactive I and II groups. For example, a first coreactive component a) may have hydroxyl groups and secondary amine groups (i.e. at least two different functional groups) and the second coreactive component b) may have isocyanate groups. One or both of the coreactive components may optionally include a catalyst for the reaction between the I groups and the II groups. The I groups and the II groups may be attached to any suitable compound such as a monomer and/or a prepolymer. Optionally, the I groups and the II groups may be attached to an oligomer, polymer, or prepolymer such as polyurea, polyester, polyurethane, or acrylic oligomer, polymer, or prepolymer. In the disclosure of the present invention, by "polymer" is meant a polymer including homopolymers and copolymers. By "composite material" is meant a combination of two or more differing materials. In general, monomers refer to compounds without repeating units in the backbone, and can be characterized, for example, by a molecular weight less than 600 Daltons, less than 500 Daltons, or less than 400 Daltons. In general, a prepolymer refers to a compound having repeat units in backbone and can be characterized, for example, by a molecular weight from 1,000 Daltons to 20,000 Daltons, from 1,000 Daltons to 10,000 Daltons, or from 2,000 Daltons to 5,000 Daltons. As used herein, polymer or oligomer molecular weight is determined by gel permeation chromatography (GPC) using appropriate standards, in many cases polystyrene or sulfonated polystyrene. Unless otherwise indicated, molecular weight refers to number average molecular weight ($M_e$).

The functional groups I and II may be terminal groups and/or pendent groups. A coreactive component can have a functionality of at least two, such as a functionality from 2 to 6. Each functional group of a coreactive component can be the same or certain functional groups of a coreactive component can be different. For example, a coreactive component can have more than one different type of functional group reactive with an isocyanate, such as a primary amine group, a secondary amine group, or a hydroxyl group.

In various examples of the present invention, the binder composition (A) may comprise:

(i) a) an isocyanate functional compound and b) an amine functional compound;

(ii) a) an acid-functional compound and b) an epoxide functional compound;

(iii) a) an ethylenically unsaturated compound and b) an amine functional compound;

(iv) a) an isocyanate functional compound and b) a thiol functional compound;

(v) a) cyclic carbonate functional compound and b) an amine functional compound;

(vi) a) an acetoacetate functional compound and b) an amine functional compound;

(vii) a) an epoxide functional compound and b) an amine functional compound;

(viii) a) a thiol functional compound and b) an ethylenically unsaturated compound;

(ix) a) an ethylenically unsaturated compound and b) a malonate functional compound;

(x) a) an epoxide functional compound and b) a thiol functional compound; and/or (xi) one or more ethylenically unsaturated compounds. Ethylenically unsaturated compounds may include alkenyl functional compounds, (meth)acrylate functional compounds, vinyl ethers, and the like. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

In a binder composition (A) comprising at least two coreactive components, the first component a) can comprise a polyisocyanate and the second component b) can comprise a polyamine; the first component can comprise a polythiol and the second component can comprise a polyalkenyl compound; the first component can comprise a Michael addition acceptor and the second component can comprise a Michael addition donor; or a combination of any of the foregoing. In a composition comprising at least two coreactive components, the first component a) can comprise an isocyanate-functional prepolymer; and the second functional group b) can comprise a primary amine, a secondary amine, a thiol, or a combination of any of the foregoing.

Binder compositions (A) may include more than two coreactive components. A reactive component can comprise a combination of reactive components having the same functional group, such as a combination of monomers and prepolymers having the same functional group. An additional coreactive component can comprise a compound having a different functional group reactive with a first functional group or the second functional group.

A binder composition (A) can be based on thiol-ene chemistry. For example, a binder composition (A) having thiol-ene functionality may include a polyene coreactive component comprising compounds or prepolymers having terminal and/or pendent olefinic double bonds, such as terminal alkenyl groups. Examples of such compounds include (meth)acrylic-functional (meth)acrylic copolymers, epoxy acrylates such as epoxy resin (meth)acrylates (such as the reaction product of bisphenol A diglycidyl ether and acrylic acid), polyester (meth)acrylates, polyether (meth) acrylates, polyurethane (meth)acrylates, amino (meth)acrylates, silicone (meth)acrylates, and melamine (meth)acrylates.

Examples of suitable polyurethane (meth)acrylates include reaction products of polyisocyanates such as 1,6-hexamethylene diisocyanate and/or isophorone diisocyanate including isocyanurate and biuret derivatives thereof with hydroxyalkyl (meth)acrylates such as hydroxyethyl (meth) acrylate and/or hydroxypropyl (meth)acrylate. Examples of suitable polyester (meth)acrylates are the reaction products of (meth)acrylic acid or anhydride with polyols, such as diols, triols and tetraols, including alkylated polyols, such as propoxylated diols and triols. Examples of suitable polyols include 1,4-butane diol, 1,6-hexane diol, neopentyl glycol, trimethylol propane, pentaerythritol and propoxylated 1,6-hexane diol.

Examples of suitable polyester (meth)acrylates include glycerol tri(meth)acrylate, trimethylolpropane tri(meth) acrylate, pentaerythritol tri(meth)acrylate, and pentaerythritol tetra(meth)acrylate. Mixtures of polyurethane (meth) acrylates, and polyester (meth)acrylates may be used.

In addition to (meth)acrylates, (meth)allyl compounds may be used either alone or in combination with (meth) acrylates. Examples of (meth)allyl compounds include polyallyl ethers such as the diallyl ether of 1,4-butane diol and the allyl ether of trimethylol propane. Examples of other (meth)allyl compounds include polyurethanes containing (meth)allyl groups. For example, reaction products of polyisocyanates such as 1,6-hexamethylene diisocyanate and/or isophorone diisocyanate including isocyanurate and biuret derivatives thereof with hydroxy-functional allyl ethers, such as the monoallyl ether of 1,4-butane diol and the diallylether of trimethylol propane can be used.

Isocyanate functionality may be incorporated into a coreactive component in a number of ways. The polyurethane (meth)acrylate or the polyurethane (meth)allyl compound may be prepared in a manner such that the reaction product contains unreacted isocyanate groups. For example, the above-mentioned reaction product of 1,6-hexamethylene diisocyanate and/or isophorone diisocyanate with hydroxyethyl (meth)acrylate and/or hydroxypropyl (meth)acrylate are reacted in an NCO/OH equivalent ratio of greater than 1. Alternately, such reaction products may be prepared such that they are isocyanate free, i.e., NCO/OH equivalent ratio equal to or less than 1, and a separate isocyanate compound such as a polyisocyanate may be included in the coreactive component.

As used herein, the term "isocyanate" includes unblocked isocyanate compounds capable of forming a covalent bond with a reactive group such as a hydroxyl, thiol or amine functional group. Thus, isocyanate can refer to "free isocyanate". Alternatively, it may be blocked with any known blocking agent.

A polythiol coreactive component refers to polyfunctional compounds containing two or more thiol-functional groups (—SH). Suitable polythiol-functional compounds include polythiols having at least two thiol groups including monomers and prepolymers. A polythiol may have ether linkages (—O—), thioether linkages (—S—), including polysulfide linkages (—S$_x$—), where x is at least 2, such as from 2 to 4, and combinations of such linkages.

Examples of suitable polythiols include compounds of the formula R$^1$—(SH)$_n$, where R$^1$ is a polyvalent organic moiety and n is an integer of at least 2, such as from 2 to 6.

Examples of suitable polythiols include esters of thiol-containing acids formed by reacting a thiol-containing acid of formula HS—R$^2$—COOH where R$^2$ is an organic moiety with a polyhydroxy compound of the structure R$^3$—(OH)$_n$, where R$^3$ is an organic moiety and n is at least 2, such as from 2 to 6. These components may be reacted under suitable conditions to give polythiols having the general structure:

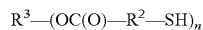

R$^3$—(OC(O)—R$^2$—SH)$_n$ wherein R$^2$, R$^3$ and n are as defined above.

Examples of thiol-containing acids include thioglycolic acid (HS—CH$_2$COOH), α-mercaptopropionic acid (HS—CH(CH$_3$)—COOH) and β-mercaptopropionic acid (HS—CH$_2$CH$_2$COOH) with polyhydroxy compounds such as glycols, triols, tetraols, pentaols, hexaols, and mixtures thereof. Other suitable polythiols include ethylene glycol bis(thioglycolate), ethylene glycol bis(χ-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Certain curable compositions of the present invention may be prepared from Michael addition reactive components. The reactive components may include primary amine-functional components and a compound having at least one Michael acceptor group.

A Michael acceptor group refers to an activated alkenyl group such as an alkenyl group proximate to an electron-withdrawing group such as a ketone, nitro, halo, nitrile, carbonyl, or nitro group. Examples of Michael acceptor groups include vinyl ketone, vinyl sulfone, quinone, enamine, ketimine, aldimine, oxazolidine, acrylate, acrylate esters, acrylonitrile, acrylamide, maleimide, alkylmethacrylates, vinyl phosphonates, and vinyl pyridines. Suitable compounds having at least one Michael acceptor group may be selected from acrylate, maleic, or fumaric-functional components.

Compounds that are useful primary amine-functional components include polyoxyalkyleneamines containing two or more primary amine groups attached to a backbone, derived, for example, from propylene oxide, ethylene oxide, or a mixture thereof. Examples of such amines include those available under the designation JEFFAMINE™ from Huntsman Corporation. Such amines can have a molecular weight ranging from 200 Daltons to 7500 Daltons, such as, for example, JEFFAMINE™ D-230, D-400, D-2000, T-403, and T-5000. Compounds useful as acrylate functional components include the acrylate functional components listed previously as examples of (poly)methacrylate. Compounds useful as maleic or fumaric components include polyesters prepared from maleic anhydride, maleic acid, fumaric acid, or their corresponding $C_1$-$C_6$ alkyl esters.

Suitable examples of catalysts for Michael addition chemistries include tributylphosphine, triisobutylphosphine, tri-tertiary-butylphosphine, trioctyl phosphine, tris(2,4,4-trimethylpentyl)phosphine, tricyclopentylphosphine, tricyclohexalphosphine, tri-n-octylphosphine, tri-n-dodecylphosphine, triphenyl phosphine, and dimethyl phenyl phosphine.

The binder composition (A) in the curable composition of the present invention may comprise a) an isocyanate-functional compound and b) an amine-functional compound to form a polyurea upon curing. In a particular example of the present invention, the binder composition (A) comprises:

a) an isocyanate-functional prepolymer having a weight average molecular weight of 1300 to 20,000 determined by gel permeation chromatography (GPC) using a polystyrene standard, wherein the isocyanate-functional prepolymer comprises (i) a reaction product of a polyisocyanate and a polyamine having primary and/or secondary amino groups; and/or (ii) a reaction product of a polyisocyanate and a polyol; and b) a mixture of polyamines, wherein at least one polyamine has an amine equivalent weight of 125 to 250.

The isocyanate functional compound a) may be a monomeric polyisocyanate, a polyisocyanate prepolymer as described below or a blend of polyisocyanates; e.g., a blend of one or more polyisocyanate prepolymers and/or one or more monomeric polyisocyanates. Suitable isocyanate functional compounds include isophorone diisocyanate (IPDI), which is 3,3,5-trimethyl-5-isocyanato-methyl-cyclohexyl isocyanate; hydrogenated (i. e., saturated) materials such as cyclohexylene diisocyanate, 4,4'-methylenedicyclohexyl diisocyanate (H12MDI); mixed aralkyl diisocyanates such as tetramethylxylyl diisocyanates, OCN—C(CH3)2-C6H4C(CH3)2-NCO; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate. Aliphatic isocyanates and/or aromatic polyisocyanates may be used depending on the nature of the fluid that is transported through the conduit being repaired. Non-limiting examples of aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

The use of various oligomeric polyisocyanates (e.g., dimers, trimers, polymeric, etc.) and modified polyisocyanates (e.g., carbodiimides, uretone-imines, etc.) is also within the scope of the invention. Often, the isocyanate-functional compound comprises a prepolymer prepared from a polyetheramine and/or a polyether polyol chain extended with a polyisocyanate. Exemplary polyether polyols include polyalkylene glycol polyols. The polyisocyanate used for the chain extension usually comprises a monomeric polyisocyanate such as isophorone diisocyanate.

Suitable polyisocyanates for use in preparing an isocyanate-functional prepolymer can include one or more of those that are known in the art. Non-limiting examples of suitable polyisocyanates can include monomeric, dimeric, trimeric and/or oligomeric polyisocyanates. For example, the isocyanate can be $C_2$-$C_{20}$ linear, branched, cyclic, aromatic, aliphatic, or combinations thereof.

Polyisocyanates used to prepare the isocyanate-functional prepolymer are often aliphatic. Examples of suitable polyisocyanates include isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Examples of aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate; mixed aralkyl diisocyanates such as tetramethylxylyl diisocyanates, OCN—C(CH$_3$)$_2$—C$_6$H$_4$C(CH$_3$)$_2$—NCO; and mixtures thereof.

The polyisocyanate used to prepare the isocyanate-functional prepolymer can include dimers such as the uretdione of 1,6-hexamethylene diisocyanate, trimers such as the biuret and isocyanurate of 1,6-hexanediisocyanate and the isocyanurate of isophorone diisocyanate, and allophonates. Modified isocyanates can also be used, including carbodiimides and uretone-imines, and mixtures thereof. Suitable materials include, without limitation, those available under the designation DESMODUR from Covestro LLC and include DESMODUR N 3200, DESMODUR N 3300, DESMODUR N 3400, DESMODUR N3900 and DESMODUR XP 2580. TOLONATE HDT LV2, available from Vencorex Chemicals, is also suitable.

It is advantageous to use the polyisocyanate in an excess amount, often greater than 10 percent by weight, based on the total weight of resin solids in the isocyanate-functional prepolymer a). The excess polyisocyanate serves as a plasticizer in the curable composition.

The polyisocyanate may be reacted with (i) a polyamine having primary and/or secondary amino groups and/or (ii) a polyol to form the isocyanate-functional prepolymer. The polyamines and polyols may be any of those known in the art, such as acrylic, polyester, polycarbonate, and/or polyether. Polyethers are used most often. Suitable polyethers include polyoxyalkyleneamines having two or more primary and/or secondary amino groups attached to a backbone, derived, for example, from propylene oxide, ethylene oxide, butylene oxide or a mixture thereof. Examples of such amines include those available under the designation JEFFAMINE, such as JEFFAMINE D-230, D-400, D-2000, HK-511, ED-600, ED-900, ED-2003, T-403, T-3000, T-5000, SD-231, SD-401, SD-2001, and ST-404 (from Huntsman Corporation). Such amines have an approximate number average molecular weight ranging from 200 to 7500. As used herein, number or weight average molecular weight of polymers and oligomers is determined by gel permeation chromatography (GPC) using a polystyrene standard.

Suitable polyethers having hydroxyl groups include polyether polyols such as polyalkylene ether polyols, which include those having the following structural formula:

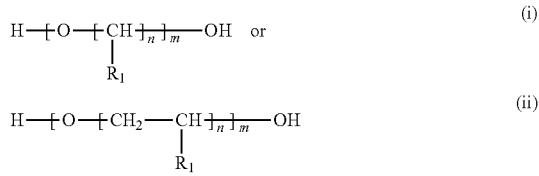

where the substituent R1 is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyether polyols include those sold under the names TERATHANE (e.g., TERATHANE 250, TERATHANE 650, TERATHANE 1000) and TERACOL, available from Invista Corporation, and POLYMEG, available from Lyondell Chemical Co.

In certain examples of the present invention, the reaction mixture used to prepare the isocyanate-functional prepolymer is essentially free of any phosphorus-containing polyols. The curable composition is also essentially free of any a phosphorus-containing polyols or reaction products thereof. As used throughout this specification, including the claims, by "essentially free" is meant that a compound is not intentionally present in the composition; and if a compound is present in the composition, it is present incidentally in an amount less than 0.1 percent by weight, usually less than trace amounts.

The isocyanate-functional prepolymer typically has a weight average molecular weight of 1,300 to 20,000, often 1,400 to 15,000, or 4,000 to 15,000, or 5,000 to 10,000. In addition, the isocyanate-functional prepolymer usually has an isocyanate equivalent weight greater than 300, often 400 to 1000.

As noted above, the curable composition of the present invention may further comprise a non-prepolymer isocyanate, such as a monomeric polyisocyanate, in combination with the isocyanate functional prepolymer. The non-prepolymer isocyanate can be the same or different from the polyisocyanate used to form the isocyanate-functional prepolymer, and may comprise one or more of those disclosed above. If combinations of isocyanates are used, the isocyanates should be substantially compatible, for example; the isocyanate-functional prepolymers can be substantially compatible with the non-prepolymer isocyanate. As used herein, "substantially compatible" means the ability of a material to form a blend with other materials that is and will remain substantially homogeneous over time. The reaction of an isocyanate with an organic material, such as in the formation of an isocyanate functional prepolymer, helps to compatibilize the isocyanate.

Amine functional compounds suitable for use as a coreactive component may be primary, secondary, tertiary amines or mixtures thereof. The amines may be monoamines, or polyamines such as diamines, triamines, higher polyamines and/or mixtures thereof. The amines also may be aromatic or aliphatic (e.g., cycloaliphatic). The amine typically is provided as a liquid having a relatively low viscosity (e.g., less than about 100 mPa·s at 25° C. using a Brookfield viscometer). In one example no primary amine is present in the amine component. In a particular example, the amine component comprises a mixture of primary and secondary amines. If a mixture of primary and secondary amines is employed, the primary amine can be present in an amount of 15 to 80 percent by weight or 20 to 50 percent by weight, with the balance being secondary amines. Although others can be used, primary amines present in the composition generally have a molecular weight greater than 200 (e.g., for reduced volatility), and secondary amines present generally comprise diamines with molecular weights of at least 190 (e.g., 210-230).

Often, the amine-functional component includes at least one secondary amine present in an amount of 20 to 85 percent by weight or 50 to 80 percent by weight. Suitable secondary amines can include acrylate and methacrylate modified amines. By "acrylate and methacrylate modified amines" is meant both mono- and poly-acrylate modified amines as well as acrylate or methacrylate modified mono- or poly-amines. Such acrylate or methacrylate modified amines may be prepared from aliphatic polyamines. Examples of suitable aliphatic polyamines include, without limitation, ethylene diamine, 1,3-bis(aminomethyl)diamine, 1,2-diaminopropane, 1,4-diaminobutane, 1,5-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. A particular example of an acrylate modified amine is a reaction product of isophorone diamine, dibutyl maleate, and butyl acrylate.

Secondary amines may include an aliphatic amine, such as a cycloaliphatic diamine. Such amines are available commercially from Huntsman Corporation (Houston, Tex.) under the designation of JEFFLINK™ such as JEFFLINK™

754. Others include CLEARLINK 1000 (Dorf-Ketal Chemicals, LLC), and aspartic ester functional amines, such as those available under the name DESMOPHEN such as DESMOPHEN NH1220, DESMOPHEN NH 1420, and DESMOPHEN NH 1520 (Covestro LLC). Alternatively, the secondary amine can be the reaction product of isophorone diamine and acrylonitrile, such as POLYCLEAR 136 (available from BASF/Hansen Group LLC). The amine can also be provided as an amine-functional resin. For example, the amine-functional resin may comprise an ester of an organic acid, such as an aspartic ester-based amine-functional reactive resin that is compatible with isocyanates; e.g., one that is solvent-free, and/or has a mole ratio of amine-functionality to the ester of no more than 1:1 so there remains no excess primary amine upon reaction. One example of such polyaspartic esters is the derivative of diethyl maleate and 1,5-diamino-2-methylpentane, available commercially from Covestro LLC of Pittsburgh, Pa. under the trade name DESMOPHEN NH1220. Other suitable compounds containing aspartate groups may be employed as well. Additionally, the secondary polyamines can include polyaspartic esters which can include derivatives of compounds such as maleic acid, fumaric acid esters, aliphatic polyamines and the like.

The amine-functional compound also may include high molecular weight primary amines, such as polyoxyalkyleneamines. The polyoxyalkyleneamines contain two or more primary amino groups attached to a backbone, derived, for example, from propylene oxide, ethylene oxide, or a mixture thereof. Examples of such amines include those available under the designation JEFFAMINE™ from Huntsman Corporation. Such amines typically have a molecular weight ranging from 200 to 7500, such as, without limitation, JEFFAMINE D-230, D-400, D-2000, T-403 and T-5000.

As noted above, in certain examples of the present invention, the second coreactive component b) may comprise a mixture of polyamines. When a mixture is used, often at least one polyamine in the mixture has an amine equivalent weight of 125 to 250. Such polyamines provide hardness to the curable composition. Suitable polyamines can include those that are known in the art. Non-limiting examples of suitable polyamines can include but are not limited to primary and secondary amines, and mixtures thereof, such as any of those disclosed herein. Amine terminated polyureas may also be used. Amines comprising tertiary amine functionality can be used provided that the amine further comprises at least two primary and/or secondary amino groups.

At least one polyamine in the mixture having an amine equivalent weight of 125 to 250 may be a non-cyclic polyamine which comprises secondary amino groups. It has been found that including such a non-cyclic polyamine in the curable composition of the present invention significantly improves abrasion resistance of a coating layer or component made from the curable composition, even if no inorganic particles as described below are included in the curable composition as abrasion resistant additive. As used herein, the term "non-cyclic polyamine" refers to a molecule comprising more than one amino group per molecule, the amino groups being linked by one or more linear or branched aliphatic organic moieties, which molecule does not comprise a cyclic moiety. Suitable non-cyclic polyamines having an amine equivalent weight of 125 to 250 which comprise secondary amino groups include aspartic ester functional amines, such as that available under the name DESMOPHEN NH 1220 (Covestro LLC).

The mixture of polyamines may include, for example, polyamines having at least two functional groups such as di-, tri-, or higher functional amines; and combinations thereof. The polyamines may be aromatic or aliphatic such as cycloaliphatic, or mixtures thereof. Suitable primary polyamines include ethylene diamine, 1,2-diaminopropane, 1,4-diaminobutane, 1,3-diaminopentane (DYTEK EP, Invista), 1,6-diaminohexane, 2-methyl-1,5-pentane diamine (DYTEK A, Invista), 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane (isophorone diamine or IPDA), 2,4- and/or 2,6-hexahydrotoluylene diamine, 2,4'-diaminodicyclohexyl methane, 4,4'-diaminodicyclohexyl methane (PACM-20, Air Products) and 3,3'-dialkyl-4,4'-diaminodicyclohexyl methanes (such as 3,3'-dimethyl-4,4'-diaminodicyclohexyl methane (DIMETHYL DICYKAN or LAROMIN C260, BASF; ANCAMINE 2049, Air Products) and 3,3'-diethyl-4,4'-diaminodicyclohexyl methane), 2,4- and/or 2,6-diaminotoluene, 3,5-diethyltoluene-2,4-diamine, 3,5-diethyltoluene-2,6-diamine, 3,5-dimethylthio-2,4-toluenediamine, 3,5-dimethylthio-2,4-toluenediamine, 2,4'- and/or 4,4'-diaminodiphenyl methane, dipropylene triamine, bis hexamethylene triamine, or combinations thereof.

Suitable secondary diamines include any of those listed above. The aliphatic secondary diamine often has an amine equivalent weight of up to 200, more often up to 162.

Other polyamines that can be used include adducts of primary polyamines with mono or polyepoxides such as the reaction product of isophorone diamine with CARDURA E-10P, available from Hexion, Inc.

Often the second coreactive component b) comprises 5 to 50 percent by weight of an aliphatic polyamine having an amine equivalent weight of 125 to 250, and 50 to 95 percent by weight of an aliphatic polyamine having an amine equivalent weight of 900 to 2500, based on the total weight of polyamines in the curable composition. For example, the curing agent often comprises 20 percent by weight CLEARLINK 1000, with an amine equivalent weight of about 161, and 80 percent by weight JEFFAMINE T-5000, a trifunctional aliphatic amine that has an amine equivalent weight of about 1902.

If a non-cyclic polyamine having an amine equivalent weight of 125 to 250 which comprise secondary amino groups is included in the second reactive component b), the second reactive component b) often comprises 1 to 20 percent by weight, such as 1.5 to 15 percent by weight, or 2 to 12.5 percent by weight, or 3 to 10 percent by weight by weight of said non-cyclic polyamine, based on the total weight of polyamines in the curable composition. For example, the second reactive component often comprises about 8 percent by weight DESMOPHEN NH 1220, a non-cyclic amine with an amine equivalent weight of about 234, about 8 percent by weight CLEARLINK 1000, a cycloaliphatic amine with an amine equivalent weight of about 161, and about 84 percent by weight JEFFAMINE T-5000, a trifunctional aliphatic amine that has an amine equivalent weight of about 1902.

When the binder composition (A) comprises a) an isocyanate-functional compound and b) an amine-functional compound, it may further comprise additional resins having hydroxyl functional groups. Examples include polyester polyols and polyether polyols, such as the polyether polyols disclosed above. TERATHANE 650 is often used as an additional resin in the curable composition. Such resins, when used, may be present in an amount of 2 to 15 percent by weight, based on the total weight of solids in the second coreactive component b).

The curable compositions of the present invention additionally comprise (B) a polysiloxane resin comprising aromatic functional groups, such as pendant phenyl groups, and terminal active hydrogen groups. The polysiloxane resin may be prepared from commercially available polysiloxane resins; for example, amine functional polysiloxane resins. Examples include Dow Corning 3055 (also known as DOW-SIL 3055), available from Dow Corning Corporation, and SiVance C1008, available from Milliken Chemical. These polysiloxane resins may be used as is; alternatively, the terminal amine groups may be chain extended to yield different terminal functional groups. Typically, the terminal active hydrogen groups on the polysiloxane resin (B) comprise hydroxyl, thiol, and/or carboxylic acid groups. For example, an amine group on the polysiloxane may be reacted with a cyclic carbonate such as ethylene or propylene carbonate to yield a urethane linkage and a terminal hydroxyl group. Alternatively, amine groups may be reacted with a lactone to yield an amide linkage and a terminal hydroxyl group. An anhydride such as methylhexahydrophthalic anhydride may be reacted with the terminal amine groups to yield an amide linkage and a terminal carboxylic acid group.

Usually the polysiloxane resin (B) is present in the curable composition in an amount of at least 0.5 percent by weight, based on the total weight of resin solids in the curable composition, such as at least 1 percent by weight. Also, the polysiloxane resin (B) may be present in the curable composition in an amount of at most 20 percent by weight, or at most 10 percent by weight, particularly when it is used as a film-forming binder. In examples of the present invention when the polysiloxane resin is present in additive amounts, it is typically present in an amount of at most 5 percent by weight or at most 3 percent by weight.

The curable composition of the present invention may comprise one or more additional ingredients. Additional ingredients may include, for example, an adhesion promoter such as amine functional materials, aminosilanes and the like, halogenated polyolefin (e. g., chlorinated polyolefin) or organic titanate or zirconate. A tertiary amine comprising 1,5-diazabicyclo[4.3.0]non-5-ene, 1,8-diazabicyclo[5.4.0] undec-7-ene, and/or 1,4-diazabicyclo[2.2.2]octane is an exemplary amine functional material suitable as an adhesion promoter. An example of an aminosilane for use as an adhesion promoter is y-aminopropyltriethoxysilane (commercially available as SILQUEST A1100 from Momentive Performance Chemicals). SILQUEST A1110 and A LINK 35 from Momentive Performance Chemicals may also be used. Other suitable amine-functional adhesion promoters include 1,3,4,6,7,8-hexahydro-2H-pyrimido-(1,2-A)-pyrimidine, hydroxyethyl piperazine, N-aminoethyl piperazine, dimethylamine ethylether, tetramethyliminopropoylamine (commercially available as POLYCAT® 15 from Air Products and Chemicals, Inc., blocked amines such as an adduct of IPDI and dimethylamine, a melamine such as melamine itself or an imino melamine resin (e.g. CYMEL® 220 or CYMEL® 303, available from Allnex). Metal-containing adhesion promoters may include metal chelate complexes such as an aluminum chelate complex (e.g. K-Kat 5218 available from King Industries) or tin-containing compositions such as stannous octoate and organotin compounds such as dibutyltin dilaurate and dibutyltin diacetate. Other adhesion promoters may include salts such as chlorine phosphate, butadiene resins such as an epoxidized, hydroxyl terminated polybutadiene resin (e.g. POLY Bd® 605E available from Atofina Chemicals, Inc.), polyester polyols (e.g. CAPA® 3091, a polyester triol available from Solvay America, Inc., and urethane acrylate compositions such as an aromatic urethane acrylate oligomer (e.g. CN999 available from Sartomer Company, Inc.). Suitable organic titanate adhesion promoters include tetra n-butyl titanate, tetra isopropyl titanate, butyl isopropyl titanate, and titanium acetyl acetonate. Suitable organic zirconate adhesion promoters include those commercially available from Dorfketal Chemicals(I) Pvt. Ltd., such as Tyzor 212, Tyzor LA, Tyzor 215, Tyzor 223, Tyzor 227, Tyzor 282.

The curable compositions according the present invention can further comprise any additional resins and/or additives that will impart to the composition a desired property. For example, the composition may further comprise a resin and/or additive that imparts additional flexibility to a coating formed from the composition or a compound that provides abrasion resistance. Flexible polyurethane resins are known in the art, and are also described, for example, in U.S. patent application Ser. Nos. 11/155,154; 11/021,325; 11/020,921; 12/056,306 and 12/056,304, incorporated in pertinent part herein by reference. The polyurethane itself can be added to the composition, or the polyurethane can be formed in situ in the curable composition. It will be appreciated that polyurethane can be formed by reacting a hydroxyl functional component with an isocyanate, much in the same manner as the amine and isocyanate components described herein react. Thus, a hydroxyl functional component can be mixed with, or used in addition to, the amine component for in situ polyurethane formation.

The curable compositions of the present invention may optionally include materials standard in the art such as fiberglass, stabilizers, thickeners, catalysts, colorants, antioxidants, UV absorbers, hindered amine light stabilizers, rheology modifiers, flow additives, anti-static agents and other performance or property modifiers that are well known in the art of surface coatings, and mixtures thereof. Suitable rheology modifiers include solid and/or liquid rheology modifiers, which can be organic and/or inorganic based polymers, such as bentonite clay, fumed silica, BYK 411 (available from Chemie), or combinations thereof.

The curable composition of the present invention may include a colorant. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used in the compositions of the present invention. It is noted that particulate colorants are different from the particles present in the abrasion resistant additive (c). It has been found that particulate colorants do not impart sufficient abrasion resistance to the curable compositions to be considered suitable, as shown in the examples below.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the compositions by grinding or simple mixing. Colorants can be incorporated by grinding into the composition by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, and U.S. Provisional Application No. 60/482,167 filed Jun. 24, 2003.

Example special effect compositions that may be used in the composition of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. Special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the composition of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. The photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. The photosensitive composition and/or photochromic composition associated with and/or at least partially bound to a polymer and/or polymerizable component have minimal migration out of the composition.

In general, the colorant can be present in the curable composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable compositions of the present invention, when applied to a substrate for example as a coating, may possess color that matches the color of an associated substrate. As used herein, the term "matches" and like terms when referring to color matching means that the color of the coating composition of the present invention substantially corresponds to a desired color or the color of an associated substrate. This can be visually observed, or confirmed using spectroscopy equipment. For instance, when the substrate for the curable composition is a footwear component, such as a polymeric bladder or upper component, the color of the curable composition may substantially match that of another footwear component. For example, a toe coated with a curable composition of the present invention can be color matched to the rest of the shoe upper, the midsole and/or the outsole. This match can be visually observed, or confirmed using spectroscopy equipment.

The curable compositions of the present composition are typically prepared as multi-package systems to prevent the components from curing prior to use. The term "multi-package systems" means compositions in which various components are maintained separately until just prior to use, such as injection molding or application to a substrate as a coating. The compositions of the present invention are usually prepared as a two-package ("2K") composition, wherein the isocyanate-functional prepolymer (a) is a first package and the curing agent (b) is the second package. The curable compositions of the present invention are suitable for use as coatings, or they may be formed into articles of manufacture such as by molding, extruding, three-dimensional printing, and other known methods of shaping into an article of manufacture.

The composition can be cured at ambient conditions, although heated air or a heat cure can be applied to the composition in order to accelerate curing of the composition or to enhance properties such as adhesion. By "ambient" conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.). Alternatively, the composition may be exposed to actinic radiation or to an elevated temperature for a time sufficient to at least partially cure the curable film-forming composition. Typical actinic radiation conditions are 315 to 400 nm (UVA) at an irradiation intensity of 1.5 to 2.0 mW/cm$^2$. The composition can be cured at ambient temperature typically in a period ranging from about 45 seconds to about 12 hours. For example, the composition can be cured at 72° F. (22.2° C.) in a period ranging from about 45 seconds to about 12 hours. If ambient temperature and baking are utilized in combination to achieve other desired properties such as better adhesion, the composition is typically allowed to stand for a period of from about 45 seconds to about 30 minutes followed by conditioning (curing) at a temperature up to about 140° F. (60° C.), for a period of time ranging from about 20 minutes to about 12 hours.

Depending on the cure chemistry of the components, the curable composition of the present invention may demonstrate a tack-free time of less than 5 minutes, such as less than 4 minutes, at a temperature of 20 to 25° C. By "tack-free time" is meant the amount of time between application of the reaction mixture to a substrate as coating, and, upon placing a cotton ball onto the coated surface, removing the cotton ball from the surface without leaving a mark or residue. When the cotton ball no longer sticks to, or must be pulled from, the surface of the layer, the layer is said to be substantially tack-free. A time beginning from the completion of applying the composition on a surface, e.g. by spraying, until when the coating is substantially tack-free is said to be the tack-free time.

In a particular example of the present invention, a footwear component is provided, prepared from any of the curable compositions described above. The curable composition may be used as a coating on a footwear component, or may be used to form the entire component itself. As used herein, the terms "footwear" and "shoe" include athletic and sport shoes, men's and women's dress shoes, men's and women's casual shoes, children's shoes, sandals, flip flops, boots, work boots, outdoor footwear, orthopedic shoes, slippers and the like. The term "footwear component" includes any component of a shoe including the outsole, midsole, polymeric bladder, upper materials and shoe liners. It will be appreciated that these components are made from a number of different materials or substrates. In certain examples, the footwear component coated according to the present invention forms all or part of a shoe upper. A particularly suitable portion of the upper coated according to the present invention is the toe. The "toe" will be understood as referring to the front portion of the shoe, which typically experiences a relatively high level of wear and/or abrasion. It has been surprisingly discovered that coating this portion of the shoe with a curable composition of the present invention results in improved resistance to wear and/or abrasion.

The footwear component may also comprise a polymeric bladder coated with a curable composition of the present invention. The polymeric bladder can be filled, for example, with plasma, water, or other fluid, such as gases, including air, nitrogen and the like. Such bladders are known in the footwear industry, and are described, for example, in U.S. Pat. Nos. 6,944,973; 6,119,371; 5,713,141; 5,952,065; 5,353,459; 4,506,460; and 4,219,945.

In certain examples of the present invention, the polymeric bladder is contained within a midsole, and it is the midsole that is coated at least in part with a curable composition of the present invention. For example, the composition can be applied to the underside of a midsole containing a nitrogen-filled polymeric bladder to protect the bladder against puncture failure. In other examples, the polymeric bladder is contained within the outsole.

The footwear component may also be an outsole comprising the curable composition of the present invention. The outsole may be formed by casting a sheet of the curable composition and post-processing the sheet to a desired shape and form, casting the curable composition in a mold, spraying the curable composition into a mold, 3-D printing, or injection-molding the component. The outsole may be preformed and then subsequently adhesively attached to the midsole. Adhesion between the midsole and the outsole comprising the curable composition may be enhanced by including an adhesion promoter in the curable composition, treating the surface of the midsole (such as by plasma treating) prior to applying the curable composition thereto, and/or applying an adhesive layer that comprises an adhesion promoter to at least one surface of the midsole and/or outsole prior to applying the outsole to the midsole. It may be desirable to wipe the midsole with a solvent prior to application of the preformed outsole (or prior to application of the curable composition if the outsole is being formed in situ); suitable solvents include those that will be innocuous to the substrate being coated, such as acetone, MEK, isopropanol and the like. When the midsole comprises foam, it may be desirable to dip the component in powder prior to application of the outsole, such as is described in U.S. patent application Ser. No. 11/448,627.

Dry film thicknesses of the footwear components may range from 20 to 1000 mils (508 to 25400 microns), or from 40 to 150 mils (1016 to 3810 microns), or from 60 to 100 mils (1524-2540 microns), or from 500 to 750 mils (12700 to 19050 microns). It will be appreciated that these layers are relatively "thick". The compositions of the present invention can also be applied as much thinner layers as well, such as 0.1 to less than 15 mils (2.54 to less than 381 microns), or 0.1 to 10 (2.54 to 254 microns), or 0.5 to 3 (12.7 to 76.2 microns), or 1 to 2 mils (25.4 to 50.8 microns). Any of the endpoints within these ranges can also be combined.

A footwear component, such as an outsole, prepared as described herein, will typically provide good traction to the user, particularly in wet conditions such as rain or snow. The component will also typically exhibit enhanced dirt build-up resistance as compared with a typical natural and/or synthetic rubber outsole or with an outsole prepared from a curable composition containing the same binder composition (A) but no polysiloxane resin (B).

The present invention is further drawn to a coated article comprising A) a substrate having at least one coatable surface; and B) a coating layer formed from a film-forming composition applied to at least one surface of the substrate and cured thereon. The film-forming composition is prepared from any of the curable compositions described above.

Non-limiting examples of suitable substrates can include metal, natural and/or synthetic stone, ceramic, glass, brick, cement, concrete, cinderblock, wood and composites and laminates thereof; wallboard, drywall, sheetrock, cement board, plastic, paper, PVC, roofing materials such as shingles, roofing composites and laminates, and roofing drywall, styrofoam, plastic composites, acrylic composites, ballistic composites, asphalt, fiberglass, soil, gravel and the like. Metals can include but are not limited to aluminum, cold rolled steel, electrogalvanized steel, hot dipped galvanized steel, titanium and alloys; polymeric materials can include but are not limited to TPO, SMC, TPU, polypropylene, polycarbonate, polyethylene, and polyamides (Nylon). The substrates can be primed metal and/or plastic; that is, an organic or inorganic layer is applied thereto. Materials that are commonly used in footwear including fabrics, leather, and foams, such as ethylene vinyl acetate (EVA) foam or polyurethane (such as TPU) foam are also suitable substrates.

The curable composition of the present invention may be applied to a bare (e.g., untreated, uncoated) substrate, a pretreated substrate and/or coated substrate having at least one other coating. For example, the surface of the substrate may be plasma-treated prior to application of the curable composition, to enhance adhesion between the substrate surface and the coating layer. Alternatively, an adhesive layer, or tie layer, comprising an adhesion promoter and/or the reaction product of an epoxy resin and a polythiol may be disposed between the substrate and the coating layer.

In another example, the curable composition of the present invention may be applied to a multi-layer coating composite. The first coating applied to a substrate may be selected from a variety of coating compositions known in the art for surface coating substrates. Non-limiting examples may include electrodepositable film-forming compositions, primer compositions, pigmented or non-pigmented monocoat compositions, pigmented or non-pigmented base coat compositions, transparent topcoat compositions, industrial coating compositions, and the like.

The compositions may be applied to the substrate by one or more of a number of methods including 3D-printing, spraying, dipping/immersion, brushing, extrusion, dispensing, or flow coating. Suitable methods and equipment for 3D-printing are, for example, described in U.S. patent application Ser. No. 15/680,846. In 3D-printing a three-dimensional object typically is made by forming successive portions or layers of the object by depositing at least two co-reactive components onto a substrate and thereafter depositing additional portions or layers of the object over the underlying deposited portion or layer. When the substrate comprises flooring, the compositions are most often applied by spraying. Conventional spray techniques and equipment for air spraying and electrostatic spraying and either manual or automatic methods can be used as described below. The coating layer typically has a dry film thickness of 1-25 mils (25.4-635 microns), often 5-80 mils (127-2032 microns). Curing conditions may be as described above.

When the curable composition is spray applied to a substrate, the composition may be prepared using a two-component mixing device. In this example, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition that is cured upon application to the uncoated or coated substrate. The A- and/or B-side can also be heated prior to application, such as to a temperature of ≤70° C., such as 60° C. Heating may promote a better viscosity match between the two components and thus better mixing, but is not necessary for the curing reaction to occur. The A- and/or B-side may be applied at a temperature 23° C., such as from 7° C. to 14° C.

A "static mix tube" applicator, which is an application device known in the art, may be used with the present invention. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Plas-Pak Industries Inc. or Cammda Corporation.

The volume mixing ratio of the isocyanate and amine may be such that the resulting isocyanate and amine reaction mixture can be applied to a substrate at a volume mixing ratio of 1:1. As used herein, "volume mixing ratio 1:1" means that the volume mixing ratio varies by up to 20% for each component, or up to 10% or up to 5%.

It is believed that the ratio of equivalents of isocyanate groups to amine groups may be selected to control the rate of cure of the coating composition of the present invention. It has been found that cure and adhesion advantages may result when the ratio of the equivalents of isocyanate groups to amine groups (also known as the reaction index) is greater than one, such as from 1.01 to 1.10:1, or from 1.03 to 1.10:1, or from 1.05 to 1.08:1 or from 1.01 to 1.4 to 1 or from 1.01 to 1.5, or 1.3 or greater to 1. The term "1:1 volume ratio" means that the volume ratio varies by up to 20% for each component, or up to 10% or up to 5%.

A commercially available mixing device can be used such as those described in Paragraphs [0037] and [0038] of United States Patent Publication Number 2007/0160851.

After shaping of the curable film-forming composition into an article of manufacture or after application of the curable film-forming composition to the substrate and upon curing, the coated substrate or cured composition demonstrates a water contact angle greater than 92°. The coated substrate additionally demonstrates dirt pick-up resistance and carbon stain resistance as demonstrated in the Examples below. Such properties render the curable film-forming compositions of the present invention particularly suitable for use in methods of mitigating dirt build-up on a substrate, in accordance with the present invention.

In the method of the present invention, dirt build-up on a substrate is mitigated by applying to at least a portion of the substrate the curable film-forming composition described above and then at least partially curing the curable film-forming composition. The curable film-forming composition is applied to at least one surface of the substrate. A substrate may have one continuous surface, or two or more surfaces such as two opposing surfaces. Typically the surface that is coated is any that is expected to be exposed to conditions conducive to dirt build-up, such as consumer and industrial vehicles, building structures, and outsoles on footwear. By "dirt" is meant soil, clay, grease, oil, minerals, detergent, salt, tar, asphalt, animal droppings, tree sap, and the like; contaminants that are commonly found outside or in industrial settings.

Each of the characteristics and examples described above, and combinations thereof, may be said to be encompassed by the present invention. The present invention is thus drawn to the following nonlimiting aspects:
1. A curable composition comprising:
(A) a binder composition comprising one or more of:
(i) a) an isocyanate functional compound and b) an amine functional compound;
(ii) a) an acid-functional compound and b) an epoxide functional compound;
(iii) a) an ethylenically unsaturated compound and b) an amine functional compound;
(iv) a) an isocyanate functional compound and b) a thiol functional compound;
(v) a) cyclic carbonate functional compound and b) an amine functional compound;
(vi) a) an acetoacetate functional compound and b) an amine functional compound;
(vii) a) an epoxide functional compound and b) an amine functional compound;
(viii) a) a thiol functional compound and b) an ethylenically unsaturated compound;
(ix) a) an ethylenically unsaturated compound and b) a malonate functional compound;
(x) a) an epoxide functional compound and b) a thiol functional compound; and
(xi) one or more ethylenically unsaturated compounds; and
(B) a polysiloxane resin comprising aromatic functional groups and terminal active hydrogen groups.
2. The curable composition according to aspect 1, wherein the binder composition (A) comprises:
a) an isocyanate-functional prepolymer having a weight average molecular weight of 1300 to 20,000 determined by gel permeation chromatography (GPC) using a polystyrene standard, wherein the isocyanate-functional prepolymer comprises (i) a reaction product of a polyisocyanate and a polyamine having primary and/or secondary amino groups; and/or (ii) a reaction product of a polyisocyanate and a polyol; and
b) a mixture of polyamines, wherein at least one polyamine has an amine equivalent weight of 125 to 250.
3. The curable composition according to aspect 2 wherein the polyisocyanate used to prepare the isocyanate-functional prepolymer is aliphatic.
4. The curable composition according to either of aspects 2 or 3 wherein isocyanate-functional prepolymer has an isocyanate equivalent weight greater than 300.
5. The curable composition according to any of aspects 2 to 4, wherein the isocyanate-functional prepolymer comprises a reaction product of a polyisocyanate and a polyol.
6. The composition according to any of aspects 2 to 5, wherein the mixture of polyamines comprises 5 to 50 percent by weight of an aliphatic polyamine having an amine equivalent weight of 125 to 250, and 50 to 95 percent by weight of an aliphatic polyamine having an amine equivalent weight of 900 to 2500.
7. The curable composition according to any of the preceding aspects, wherein the terminal active hydrogen groups on the polysiloxane resin (B) comprise hydroxyl and/or carboxylic acid groups.
8. The curable composition according to any of the preceding aspects, wherein the polysiloxane resin (B) comprises urethane linkages.
9. The curable composition according to any of the preceding aspects, wherein the polysiloxane resin (B) is present in the curable composition in an amount of at least 0.5 percent by weight, based on the total weight of resin solids in the curable composition.
10. A coated article comprising:
A) a substrate having at least one coatable surface, and
B) a coating layer formed from a film-forming composition applied to at least one surface of the substrate and cured thereon, wherein the film-forming composition is prepared from the curable composition according to any of aspects 1 to 9.
11. The coated article according to aspect 10, wherein the substrate comprises wood, metal, glass, fabric, leather, a composite, or a polymeric material.
12. The coated article according to either of aspects 10 or 11, wherein the substrate comprises a plasma-treated surface adjacent to the coating layer formed from the curable composition.
13. The coated article according to any of aspects 10 to 12, wherein the coated article comprises a footwear component.
14. The coated article according to aspect 13, wherein said footwear component comprises an outsole.
15. Use of an at least partially cured curable composition according to any of aspects 1 to 9 applied to a substrate to mitigate dirt build-up on the substrate.

Example A

A polysiloxane resin comprising aromatic functional groups and terminal active hydrogen groups was prepared as follows:

| Ingredients | Parts by weight |
|---|---|
| Charge #1 | |
| Dow Corning (DOWSIL) 3055[1] | 302.6 |
| Charge #2 | |
| Propylene Carbonate[2] | 64.06 |
| Charge #3 | |
| Dowanol PM Acetate[3] | 40.8 |

[1] Dow Corning 3055 (DOWSIL 3055) is an amine functional silicone resin available from Dow Chemical Company
[2] Propylene Carbonate is available from BASF Corporation
[3] Dowanol PM Acetate is propylene glycol monomethyl ether acetate, available from Dow Chemical Company Charge #1 was added into a 1-liter, 4-necked flask equipped with a motor-driven steel stir blade, a thermocouple, a nitrogen sparge, and a water-cooled condenser. Next, Charge #2 was added, and the mixture was allowed to exotherm. When the exotherm subsided, Charge #3 was added and the reaction was heated to 100° C. by a mantle controlled by the thermocouple via a temperature feedback control device. The reaction mixture was held at temperature until the sample measured <0.1 milliequivalents (meq) of amine per gram of sample as determined by titration with 0.1N HCl. The solids were measured (110° C. for 1 hour) and adjusted to 80% solids by addition of Dowanol PM Acetate. The molecular weight was determined to be approximately 3020 (Mw) by a low molecular weight GPC method relative to polystyrene standard of 162-30,000 Da, using a Waters 2695 separation module with a Waters 2414 differential refractometer (RI detector). Tetrahydrofuran (THF) was used as the eluent at a flow rate of 1 ml min-1, and three Styragel High Resolution (HR2/HR1/HR0.5, 300× 7.5 mm) columns were used for separation.

Example B

An isocyanate-functional polymer was prepared from the following ingredients as described below:

| Ingredients | Weight (grams) |
|---|---|
| Isophorone Diisocyanate[1] | 600.2 |
| POLYMEG 2000[2] | 2213.3 |
| Dibutyltin Dilaurate | 0.60 |
| DESMODUR XP2580[3] | 228.2 |
| TOLONATE HDT LV2[4] | 196.3 |

[1]Available from Covestro LLC
[2]Available from Lyondell Petrochemical
[3]Polyisocyanate available from Covestro LLC
[4]Polyisocyanate available from Vencorex Chemicals A total of 600 grams of isophorone diisocyanate and 0.563 g of dibutyltin dilaurate were placed in a suitable reaction vessel equipped with a stirrer, temperature probe, a condenser and a nitrogen inlet tube and blanketed with nitrogen gas. At room temperature (23° C.) 2213.3 grams of POLYMEG 2000 was added over 75 minutes during which time the reaction exotherm reached ~60° C. After the feed was complete, the mixture was slowly heated to 70° C. The reaction was held at this temperature for 90 minutes, during which time the isocyanate equivalent weight reached about 910 grams per equivalent. Next, 228.2 g of DESMODUR XP2580 and 196.3 g of TOLONATE HDT LV2 were added and the mixture was stirred for ~30 minutes, after which the material had a measured isocyanate equivalent weight of about 622 grams per equivalent as measured by ASTM D2572 (2010) "Standard Test Method for Isocyanate Groups in Urethane Materials or Prepolymers" and the polymer had a Molecular Weight (Mw) of ~7960 as measured by Gel Permeation Chromatography versus a polystyrene standard.

Examples 1 and 2

Curable film-forming compositions were prepared with and without a polysiloxane resin comprising aromatic functional groups and terminal active hydrogen groups. Example 1 is comparative in that it does not contain the polysiloxane resin; Example 2 is an example of the present invention.

For Examples 1 and 2, at least one of the following tests was performed on a coated article formed by application and curing of a coating composition. A description of each test is provided below.

Taber Abrasion:

A 2 mm thick sample was dispensed onto an e-coated steel panel. The sample and panel were then cut to a 4-inch by 4-inch square. A hole was then drilled into the middle of the 4" by 4" sample. The weight of the sample was then taken. A 5135 Rotary Platform Abraser from Taber Industries with 1000 grams weight per rotary arm was used to test the samples. Each rotary arm had a rotating Taber Rubber S-32/CS-0 wheel with GARDCO AB-S-42 200MP sandpaper as the abrading substance. The sample was abraded for a total of 1000 abrasion cycles and the sandpaper abrader was changed every 500 abrasion cycles. After abrasion, the weight of the sample was taken again and compared to the weight before abrasion. The weight was then converted to volume using density and reported below.

$H_2O$ Contact Angle Test:

The 2K coating was dispensed into a mold and a 6.5 cm by 9.5 cm EVA plaque was pushed into the coating while it cured to provide a ridged backing. The sample was then placed in a 140° F. hot room for 20 hours to allow for complete curing. The coating was allowed to cool before testing. Before dirt pick up and carbon stain testing, the contact angle of DI water was determined by using a VCA Optima manual contact angle machine from AST Products. A drop of water was placed onto the sample and then a picture was captured using VCA Optima software. The contact angle was then determined by taking the point of contact and comparing it the top and midpoint of the water droplet. This angle is reported below.

Arizona Dirt Test:

The 2K coating was dispensed into a mold and a 6.5 cm by 9.5 cm EVA plaque was pushed into the coating while it cured to provide a ridged backing. The sample was then placed in a 140° F. hot room for 20 hours to allow for complete curing. The coating was allowed to cool before testing. Before testing, the color of the sample was taken using a MacBeth Coloreye 2125 or equivalent using the Hunter Lab color space and D65 illuminant. 150 g of Arizona Dirt, purchased from PTI Powder Technology Inc, was added to a rotary ball mixer container, purchased from Thumler's Tumbler, with a 6.5 inch internal diameter; no media or balls were used. The sample was placed in the container with the dirt and screwed closed. The container was placed onto a Thumler's Tumbler Model B ball mill rotator, no media or balls were used in the container, and the container was rotated for 20 minutes using a 1550 RPM, 60 Hz, 115V, 0.8 A motor. The sample was then removed from the dirt. While still dirty, the Delta E of the stained region was then rated by using a MacBeth Coloreye 2125 or equivalent using the Hunter Lab color space and D65 illuminant. The sample was then cleaned with DI Water and allowed to dry. The Delta E of the cleaned region was then rated by using a MacBeth Coloreye 2125 or equivalent using the Hunter Lab color space and D65 illuminant. These numbers are reported below.

Carbon Stain Resistance:

The 2K coating was dispensed into a mold and a 6.5 cm by 9.5 cm EVA plaque was pushed into the coating while it cured to provide a ridged backing. The sample was then placed in a 140° F. hot room for 20 hours to allow for complete curing. The coating was allowed to cool before testing. Before testing, the color of the sample was taken using a MacBeth Coloreye 2125 or equivalent using the Hunter Lab color space and D65 illuminant. A Carbon black slurry was made with a composition of 9% Lamp Black LB-1001 Carbon black and 0.9% Triton X-100 Carbon black in DI Water. The carbon black slurry was mixed and then the coating was dipped into the slurry for 5 seconds. The slurry covered coating was then placed into a 120° F. electric oven for 1 hour. Once the sample was cool enough to touch, the Carbon Black slurry was washed off with warm water then a 1% Tide solution was used to clean the stain off the sample. The sample is washed until no more stain can be removed then rinsed with warm water and dried. The Delta E of the stained region was then rated by using a MacBeth Coloreye 2125 or equivalent using the Hunter Lab color space and D65 illuminant. The Carbon Stain Resistance test is an indication of the samples ability to resist staining and the ability to clean the sample after staining.

White colored coating compositions for Comparative Example 1 and Example 2 were prepared using the components listed in Table 1 below (amounts in grams). Test results for coatings formed from these coating compositions are provided in Table 2.

The coating compositions for Comparative Example 1 and Example 2 were prepared in 2 parts and dispensed using a 2K (2-component) cartridge system in a 1:1 volume ratio using a V.O. Baker Air Operated Spray Gun.

"Part 1" side: The amine component consisted of the ingredients listed in the below examples. In all examples, a pre-paste was mixed using a 9:1 ratio of JEFFAMINE T5000 and $TiO_2$ and was ground using a Lau with zircoa beads for 3 hours. The beads were filtered out of the paste. The paste was used to bring in the desired levels of $TiO_2$ and JEFFAMINE T5000 with the rest of the resin components. The paste was weighed out and the rest of the resins and fillers were added to the paste. The PETROLITE particles and the EXPANCEL microspheres were folded into the resins by hand and then mixed using a high speed Cowles blade. The contents were kept at 60° C. prior to application in order to achieve spraying viscosities.

"Part 2" side: Isophorone diisocyanate prepolymer of Example B; the contents were kept at 60° C. prior to application in order to achieve spraying viscosities.

Dispensing the Coating: The amine portion, Part 1, was placed into half of a 2-sided VO Baker 1:1 volume 2K spray cartridge. The isocyanate portion, Part 2, was placed into the other half of a 2-sided VO Baker 1:1 volume 2K spray cartridge. The coating was dispensed using a using a 2K (2-component) cartridge system in a 1:1 volume ratio using a V.O. Baker Air Operated Spray Gun. The air pressure was held at 60 psi and the coating was dispensed into TEFLON molds. EVA was then pushed into the coating before the coating gelled to provide a rigid backing. The coating was then cured for 20 hours in a 140° F. hot room. This was the coating that was then tested.

TABLE 1

|  | Comparative Example 1 | Example 2 |
| --- | --- | --- |
| Part 1 Amine |  |  |
| JEFFAMINE T5000[1] | 83.48 | 83.12 |
| CLEARLINK 1000[2] | 29.47 | 29.34 |
| R-960 $TiO_2$[3] | 1.50 | 1.50 |
| PETROLITE 5000 T6[4] | 14.31 | 14.24 |
| EXPANCEL 461 DE[5] | 2.52 | 2.51 |
| Siloxane Resin of Example A | 0 | 0.66 |
| Part 2 Isocyanate |  |  |
| Isocyanate of Example B | 168.73 | 168.65 |

[1] JEFFAMINE T5000, available from Huntsman (Salt Lake City, UT)
[2] CLEARLINK 1000, available from Dorf Ketal Chemicals (Houston, TX USA)
[3] Ti-Pure R-960 $TiO_2$, available from DuPont (Wilmington, DE)
[4] PETROLITE 5000 T6, available from Baker Hughes (Houston, TX USA)
[5] EXPANCEL 461 DE microspheres from AkzoNobel (Amsterdam, Netherlands)

TABLE 2

|  | Comparative Example 1 | Example 2 |
| --- | --- | --- |
| Taber Abrasion | 0.370 | 0.315 |
| $H_2O$ Contact angle before Arizona Dirt Test | 103.6 | 110.2 |
| Arizona Dirt Delta E (w/ dirt picked up) | 6.04 | 5.18 |
| Arizona Dirt Delta E (water cleaned) | 0.87 | 0.66 |
| Carbon Stain resistance Delta E after detergent | 3.25 | 0.88 |

The data in Table 2 illustrate that the composition of the present invention (Example 2) demonstrates reduced color change in the Arizona Dirt Test and Carbon Stain Resistance Test, indicating reduced dirt pick-up compared to the composition that does not contain a polysiloxane resin.

Whereas particular examples of this invention have been described above for purposes of illustration, it will be evident to those skilled in the art that numerous variations of the details of the present invention may be made without departing from the scope of the invention as defined in the appended claims.

What is claimed is:

1. A curable composition comprising:
   (A) a binder composition comprising one or more of:
   (i) a) an isocyanate functional compound and b) an amine functional compound;
   (ii) a) an acid-functional compound and b) an epoxide functional compound;
   (iii) a) an ethylenically unsaturated compound and b) an amine functional compound;
   (iv) a) an isocyanate functional compound and b) a thiol functional compound;
   (v) a) cyclic carbonate functional compound and b) an amine functional compound;
   (vi) a) an acetoacetate functional compound and b) an amine functional compound;
   (vii) a) an epoxide functional compound and b) an amine functional compound;
   (viii) a) a thiol functional compound and b) an ethylenically unsaturated compound;
   (ix) a) an ethylenically unsaturated compound and b) a malonate functional compound;
   (x) a) an epoxide functional compound and b) a thiol functional compound; and
   (xi) one or more ethylenically unsaturated compounds; and
   (B) a polysiloxane resin comprising aromatic functional groups and terminal active hydrogen groups comprising hydroxyl and/or carboxylic acid groups.

2. The curable composition according to claim 1, wherein the binder composition (A) comprises:
   a) an isocyanate-functional prepolymer having a weight average molecular weight of 1300 to 20,000, wherein the isocyanate-functional prepolymer comprises (i) a reaction product of a polyisocyanate and a polyamine having primary and/or secondary amino groups; and/or (ii) a reaction product of a polyisocyanate and a polyol; and
   b) a mixture of polyamines, wherein at least one polyamine has an amine equivalent weight of 125 to 250.

3. The curable composition according to claim 2 wherein the polyisocyanate used to prepare the isocyanate-functional prepolymer is aliphatic.

4. The curable composition according to claim 2 wherein isocyanate-functional prepolymer has an isocyanate equivalent weight greater than 300.

5. The curable composition according to claim 2, wherein the isocyanate-functional prepolymer comprises a reaction product of a polyisocyanate and a polyol.

6. The composition according to claim 2, wherein the mixture of polyamines comprises 5 to 50 percent by weight of an aliphatic polyamine having an amine equivalent weight of 125 to 250, and 50 to 95 percent by weight of an aliphatic polyamine having an amine equivalent weight of 900 to 2500.

7. The curable composition according to claim 1, wherein the polysiloxane resin (B) comprises urethane linkages.

8. The curable composition according to claim 1, wherein the polysiloxane resin (B) is present in the curable composition in an amount of at least 0.5 percent by weight, based on the total weight of resin solids in the curable composition.

9. A footwear component comprising the curable composition of claim 1.

10. The footwear component according to claim 9, wherein said footwear component comprises an outsole.

11. A coated article comprising:
   A) a substrate having at least one coatable surface, and
   B) a coating layer formed from a film-forming composition applied to at least one surface of the substrate and cured thereon, wherein the film-forming composition is prepared from the curable composition of claim 1.

12. The coated article according to claim 11, wherein the substrate comprises wood, metal, glass, fabric, leather, a composite, or a polymeric material.

13. The coated article according to claim 12, wherein the substrate comprises a plasma-treated surface adjacent to the coating layer formed from the curable composition.

14. The coated article according to claim 11, wherein the coated article comprises a footwear component.

15. The coated article according to claim 14, wherein said footwear component comprises an outsole.

16. A method of mitigating dirt build-up on a substrate, comprising:
   (1) applying to at least a portion of the substrate the curable composition of claim 1 to form a coated substrate; and
   (2) at least partially curing the curable composition.

17. A method of mitigating dirt build-up on a substrate, comprising:
   (1) applying to at least a portion of the substrate the curable composition of claim 2 to form a coated substrate; and
   (2) at least partially curing the curable composition.

\* \* \* \* \*